Patented Aug. 26, 1924.

1,506,460

UNITED STATES PATENT OFFICE.

KARL STREITWOLF, OF FRANKFORT ON THE MAIN, GERMANY, ASSIGNOR TO FARB-WERKE VORM. MEISTER LUCIUS & BRÜNING, OF HOCHST ON THE MAIN, GERMANY, A CORPORATION OF GERMANY.

PREPARING ARSENOBENZENE DERIVATIVES WHICH ARE STABLE IN SOLUTION.

No Drawing.    Application filed September 17, 1923. Serial No. 663,292.

*To all whom it may concern:*

Be it known that I, KARL STREITWOLF, Ph. D., apothecary, a citizen of Germany, residing at Frankfort on the Main, Guntersburg Allee 50, Germany, have invented certain new and useful Improvements in Preparing Arsenobenzene Derivatives which are Stable in Solution, of which the following is a specification.

In United States Patent No. 1,431,671 of 1922 and German Patent No. 375,718 is described a process according to which preparations of an excellent stability are obtained by combining sulfoxylate compounds of any arsenobenzenes with any arsenobenzenes.

Now we have found that by the combination of formalydehydebisulphite compounds of arsenobenzenes with any arsenobenzenes there are also obtained products of excellent stability and of eminent therapeutic efficacy. The combination may be effected either in a dry state or in solution or suspension.

*Examples.*

(1.) 3.0 g. of the monoformaldehydebisulphite compound of dioxydiaminoarsenobenzene are dissolved in 10 ccm. of $H_2O$ and there are further dissolved 3 g. of the silver compound of the sodium salt of dioxydiaminoarsenobenzene also in 10 ccm. of $H_2O$. Both solutions are then combined and allowed to stand for one hour in an atmosphere of nitrogen, if required, while heating. The solution is then introduced in about 1½ litres of alcohol and the precipitate is separated. The compound thus obtained is a brown to brownish-black powder, which is soluble in water with alkaline reaction and insoluble in alcoholic ether. Carbon dioxide does not cause any precipitate from the aqueous solution.

Instead of the monoformaldehyde compound the diformaldehyde compound may be used, in which case preparations of similar properties are obtained.

(2.) 5 g. of the diformaldehydebisulphite compound of p-arseno-di-(1-phenyl-2.3-dimethyl-4-amino-5-pyrazolone), having the structural formula:

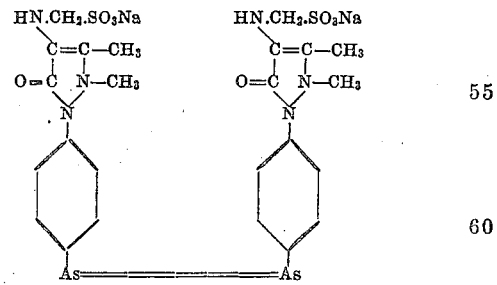

are dissolved in 15 ccm. of water. In the same way there are dissolved in 15 ccm. of water 5 g. of the silver-sodium compound of dioxydiaminoarsenobenzene. Both solutions are combined and allowed to stand for one hour under nitrogen, if required, while heating. The solution is then introduced into 1½ litres of alcohol and the precipitate is filtered off. The compound thus obtained is a brown to brownish-black powder, clearly soluble in water. The solution remains clear while introducing carbonic acid.

(3.) 5 g. of monoformaldehydebisulphite of the p-arsenodi-(1-phenyl-2.3-dimethyl-4-amino-5-pyrazolone) are dissolved in 15 ccm. of water and this solution is combined with the solution of 5 g. of the silver-sodium compound of dioxydiaminoarsenobenzene— also in 15 ccm. of water. The solution is allowed to stand for one hour under nitrogen, if required, while heating and then precipitated with 1½ litres of alcohol. The substance obtained is a brown powder, clearly soluble in water. The solution remains clear when introducing carbonic acid.

(4.) 4,5 g. formaldehydebisulphite of the $4^1.4$-bismethyl-amino-$3^1.3$-$5^1.5$-tetraamino-arsenobenzene, having the structural formula:

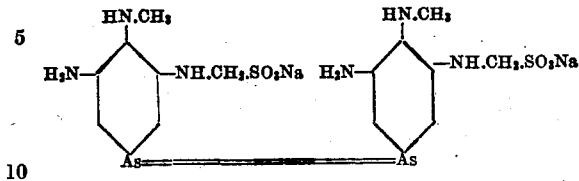

are dissolved in 25 ccm. of water and to this solution there are added 4,5 g. of the silver-sodium compound of the dioxydiaminoarsenobenzene dissolved in 25 ccm. of water. The solution is allowed to stand for one hour under nitrogen, if required, while heating. The substance is precipitated with 1½ litres of alcohol and the precipitate is filtered off. The compound thus obtained is a brown powder, clearly soluble in water. The solution remains clear when introducing carbonic acid.

Having now described my invention what I claim is:

The process of making arsenical preparations which are stable in solution, which comprises combining the silver-sodium salt of 4,4'-dioxy-3,3'-diamino-arsenobenzene with a formaldehyde-bisulphite compound of an arsenobenzene.

In testimony whereof, I affix my signature.

KARL STREITWOLF. [L. S.]

Witnesses:
C. C. L. B. WYLES,
PAUL A. WILLIAMS.